United States Patent
Malinowski et al.

(10) Patent No.: US 9,525,700 B1
(45) Date of Patent: Dec. 20, 2016

(54) SYSTEM AND METHOD FOR DETECTING MALICIOUS ACTIVITY AND HARMFUL HARDWARE/SOFTWARE MODIFICATIONS TO A VEHICLE

(71) Applicant: REMTCS Inc., Red Bank, NJ (US)

(72) Inventors: Richard E. Malinowski, Colts Neck, NJ (US); Tommy Xaypanya, Lamar, MS (US)

(73) Assignee: REMTCS Inc., Red Bank, NJ (US)

( * ) Notice: Subject to any disclaimer, the term of this patent is extended or adjusted under 35 U.S.C. 154(b) by 0 days.

(21) Appl. No.: 14/516,418

(22) Filed: Oct. 16, 2014

Related U.S. Application Data

(63) Continuation-in-part of application No. 14/216,634, filed on Mar. 17, 2014, and a continuation-in-part of application No. 14/216,345, filed on Mar. 17, 2014, application No. 14/516,418, which is a continuation-in-part of application No. 14/216,665,
(Continued)

(51) Int. Cl.
*G06F 21/00* (2013.01)
*H04L 29/06* (2006.01)
*H04L 29/08* (2006.01)
*G06N 99/00* (2010.01)
(Continued)

(52) U.S. Cl.
CPC ............... *H04L 63/145* (2013.01); *G06N 3/08* (2013.01); *G06N 99/005* (2013.01); *H04L 41/0659* (2013.01); *H04L 41/145* (2013.01); *H04L 41/16* (2013.01); *H04L 63/1408* (2013.01)

(58) Field of Classification Search
CPC ............... H04L 63/145; H04L 63/1408; H04L 41/0659; H04L 41/145; H04L 41/16; G06N 3/08; G06N 99/005
See application file for complete search history.

(56) References Cited

U.S. PATENT DOCUMENTS

| 5,825,906 A | 10/1998 | Obata et al. |
| 6,357,008 B1 | 3/2002 | Nachenberg |

(Continued)

FOREIGN PATENT DOCUMENTS

| JP | WO 2013093591 A1 * | 6/2013 | ......... H04L 63/1408 |
| WO | WO 2013/147903 | 10/2013 | |
| WO | WO 2013147903 A1 * | 10/2013 | ............ H04W 4/023 |

OTHER PUBLICATIONS

Fawad Ahmad, Sahibzada Ali Mahmud; "Poster: Accurate Vehicle Detection in Intelligent Transportation Systems (ITS) using Wireless Magnetic Sensors"; Oct. 2015; SenSys '15: Proceedings of the 13th ACM Conference on Embedded Networked Sensor Systems; Publisher: ACM; pp. 385-386.*

(Continued)

*Primary Examiner* — Amir Mehrmanesh
*Assistant Examiner* — Courtney Fields
(74) *Attorney, Agent, or Firm* — Sheridan Ross P.C.

(57) ABSTRACT

An Artificial Intelligence (AI) interface and engine is described that enables the monitoring and analysis of vehicle information to determine if the vehicle has had at least one of hardware and software maliciously changed, added, or removed. The AI interface may determine the presence of the maliciously changed, added, or removed hardware and/or software such as by receiving an emergency condition from at least one sensor that is in disagreement with another sensor.

20 Claims, 5 Drawing Sheets

Related U.S. Application Data filed on Mar. 17, 2014, and a continuation-in-part of application No. 14/199,917, filed on Mar. 6, 2014, application No. 14/516,418, which is a continuation-in-part of application No. 14/163,186, filed on Jan. 24, 2014, now Pat. No. 9,332,028.

(60) Provisional application No. 61/901,269, filed on Nov. 7, 2013, provisional application No. 61/897,745, filed on Oct. 30, 2013, provisional application No. 61/891,598, filed on Oct. 16, 2013, provisional application No. 61/794,547, filed on Mar. 15, 2013, provisional application No. 61/794,505, filed on Mar. 15, 2013, provisional application No. 61/794,472, filed on Mar. 15, 2013, provisional application No. 61/794,430, filed on Mar. 15, 2013, provisional application No. 61/756,573, filed on Jan. 25, 2013, provisional application No. 61/891,595, filed on Oct. 16, 2013, provisional application No. 61/891,587, filed on Oct. 16, 2013.

(51) Int. Cl.
*H04L 12/24* (2006.01)
*G06N 3/08* (2006.01)

(56) References Cited

U.S. PATENT DOCUMENTS

| | | |
|---|---|---|
| 7,321,883 B1 | 1/2008 | Freedy et al. |
| 7,891,004 B1 | 2/2011 | Gelvin et al. |
| 8,812,868 B2 | 8/2014 | Blaisdell et al. |
| 8,918,881 B2 | 12/2014 | Bettini et al. |
| 2002/0162015 A1 | 10/2002 | Tang |
| 2005/0050336 A1 | 3/2005 | Liang et al. |
| 2005/0198242 A1 | 9/2005 | Kim |
| 2005/0267911 A1 | 12/2005 | Kamath et al. |
| 2005/0268338 A1 | 12/2005 | Made |
| 2006/0026675 A1 | 2/2006 | Cai et al. |
| 2008/0016570 A1 | 1/2008 | Capalik |
| 2008/0040801 A1 | 2/2008 | Buriano et al. |
| 2009/0089879 A1 | 4/2009 | Wang et al. |
| 2009/0165137 A1 | 6/2009 | Yoo et al. |
| 2009/0172816 A1 | 7/2009 | Maino et al. |
| 2009/0300589 A1 | 12/2009 | Watters et al. |
| 2010/0138925 A1 | 6/2010 | Barai et al. |
| 2010/0153315 A1 | 6/2010 | Gao et al. |
| 2011/0235650 A1 | 9/2011 | Martinez et al. |
| 2011/0258701 A1 | 10/2011 | Cruz et al. |
| 2012/0215728 A1 | 8/2012 | Isaiadis et al. |
| 2012/0240185 A1 | 9/2012 | Kapoor et al. |
| 2012/0284699 A1 | 11/2012 | Van Der Merwe et al. |
| 2013/0014261 A1 | 1/2013 | Milliken et al. |
| 2013/0055246 A1 | 2/2013 | Li et al. |
| 2013/0097704 A1 | 4/2013 | Gavrilut et al. |
| 2013/0097706 A1 | 4/2013 | Titonis et al. |
| 2013/0117006 A1 | 5/2013 | Varghese et al. |
| 2013/0145065 A1* | 6/2013 | Ricci ................. G06F 9/54 710/241 |
| 2013/0145482 A1* | 6/2013 | Ricci ................. G06F 9/54 726/28 |
| 2013/0232576 A1 | 9/2013 | Karnikis et al. |
| 2013/0332026 A1 | 12/2013 | McKown et al. |
| 2014/0208397 A1 | 7/2014 | Peterson et al. |
| 2014/0215621 A1 | 7/2014 | Xaypanya et al. |
| 2014/0279762 A1 | 9/2014 | Xaypanya et al. |
| 2014/0279770 A1 | 9/2014 | Xaypanya et al. |
| 2014/0283079 A1 | 9/2014 | Xaypanya et al. |

OTHER PUBLICATIONS

Alazab et al. "Zero-day Malware Detection based on Supervised Learning Algorithms of API call Signatures," Proceedings of the 9th Australasian Data Mining Conference, Australian Computer Society, 2011, Ballarat, Australia, pp. 171-182.

International Search Report for International (PCT) Patent Application No. PCT/US2014/060926, mailed Jan. 29, 2015 11 pages.

Official Action for U.S. Appl. No. 14/163,186, mailed Apr. 20, 2015 16 pages.

International Preliminary Report on Patentability for International (PCT) Patent Application No. PCT/US2014/012841, mailed Aug. 6, 2015 7 pages.

International Preliminary Report on Patentability for International (PCT) Patent Application No. PCT/US2014/030362, mailed Sep. 24, 2015 7 pages.

International Preliminary Report on Patentability for International (PCT) Patent Application No. PCT/US2014/021098, mailed Sep. 24, 2015 6 pages.

Official Action for U.S. Appl. No. 14/216,345, mailed Nov. 6, 2015 12 pages.

U.S. Appl. No. 14/216,345, filed Oct. 16, 2014, Xaypanya et al.
U.S. Appl. No. 14/516,438, filed Oct. 16, 2014, Xaypanya et al.
U.S. Appl. No. 14/516,453, filed Oct. 16, 2014, Xaypanya et al.
U.S. Appl. No. 14/528,560, filed Oct. 30, 2014, Xaypanya et al.

International Search Report and Written Opinion for International (PCT) Patent Application No. PCT/US14/12841, mailed Jun. 16, 2014 8 pages.

International Search Report and Written Opinion for International (PCT) Patent Application No. PCT/US14/30362, mailed Aug. 22, 2014 8 pages.

International Search Report and Written Opinion for International (PCT) Patent Application No. PCT/US14/21098, mailed Aug. 5, 2014 7 pages.

\* cited by examiner

SYSTEM AND METHOD FOR DETECTING MALICIOUS ACTIVITY AND HARMFUL HARDWARE/SOFTWARE MODIFICATIONS TO A VEHICLE

CROSS-REFERENCE TO RELATED APPLICATIONS

The present application is a Continuation-in-Part of U.S. patent application Ser. No. 14/216,634, filed Mar. 17, 2014, which claims the benefit of U.S. Provisional Application No. 61/901,269, filed Nov. 7, 2013, and claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/794,547, filed Mar. 15, 2013, and claims the benefit of U.S. Provisional Application No. 61/794,505, filed Mar. 15, 2013, and claims the benefit of U.S. Provisional Application No. 61/794,472, filed Mar. 15, 2013, and claims the benefit of U.S. Provisional Application No. 61/794,430, filed Mar. 15, 2013, and the present application is a Continuation-in-Part of U.S. patent application Ser. No. 14/216,345, filed Mar. 17, 2014, which claims the benefit of U.S. Provisional Application No. 61/901,269, filed Nov. 7, 2013, and claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/794,547, filed Mar. 15, 2013, and claims the benefit of U.S. Provisional Application No. 61/794,505, filed Mar. 15, 2013, and claims the benefit of U.S. Provisional Application No. 61/794,472, filed Mar. 15, 2013, and claims the benefit of U.S. Provisional Application No. 61/794,430, filed Mar. 15, 2013, and the present application is a Continuation-in-Part of U.S. patent application Ser. No. 14/216,665, filed Mar. 17, 2014, which claims the benefit of U.S. Provisional Application No. 61/901,269, filed Nov. 7, 2013, and claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/794,547, filed Mar. 15, 2013, and claims the benefit of U.S. Provisional Application No. 61/794,505, filed Mar. 15, 2013, and claims the benefit of U.S. Provisional Application No. 61/794,472, filed Mar. 15, 2013, and claims the benefit of U.S. Provisional Application No. 61/794,430, filed Mar. 15, 2013, and the present application is a Continuation-in-Part of U.S. patent application Ser. No. 14/199,917, filed Mar. 6, 2014, which claims the benefit of U.S. Provisional Application No. 61/901,269, filed Nov. 7, 2013, and claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/794,547, filed Mar. 15, 2013, and claims the benefit of U.S. Provisional Application No. 61/794,505, filed Mar. 15, 2013, and claims the benefit of U.S. Provisional Application No. 61/794,472, filed Mar. 15, 2013, and claims the benefit of U.S. Provisional Application No. 61/794,430, filed Mar. 15, 2013, and the present application is a Continuation-in-Part of U.S. patent application Ser. No. 14/163,186, filed Jan. 24, 2014, which claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/794,547, filed Mar. 15, 2013, and claims the benefit of U.S. Provisional Application No. 61/794,505, filed Mar. 15, 2013, and claims the benefit of U.S. Provisional Application No. 61/794,472, filed Mar. 15, 2013, and claims the benefit of U.S. Provisional Application No. 61/794,430, filed Mar. 15, 2013, and claims the benefit of U.S. Provisional Application No. 61/756,573, filed Jan. 25, 2013, and the present application claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/891,595, filed Oct. 16, 2013, and claims the benefit of U.S. Provisional Application No. 61/891,587, field Oct. 16, 2013, the complete disclosures of which are incorporated herein by reference in their entirety.

FIELD OF THE DISCLOSURE

The present disclosure is generally directed toward vehicles and more particularly to the electronics therein.

BACKGROUND

Vehicles have benefited from the advancement in electronics and computing technology. Vehicles now comprise an extensive array of electronics to support and enable navigation, entertainment, comfort, efficiency, reliability, and security.

The complexity of vehicle electronics often requires updates to the vehicle's hardware and/or software. Unfortunately, the ability to provide such updates also provides an avenue for malware. The malware may be a deliberate act to tamper with the vehicle or extract information from the vehicle. However, malware may have only beneficial intentions but have undesirable consequences. For example, replacing a hardware/software component in an automobile to allow for greater acceleration, as compared to the factory-intended performance, may inadvertently cause the vehicle's transmission to operate outside of the parameters for which it was engineered. Such an event may only occur with a certain other set of operating parameters, which may be rarely encountered.

Through debugging and testing processes are often employed to account for most or even all known conditions that may cause a vehicle to be vulnerable to malware. However, as every owner of a computer knows, malware always seems to find a way and frequent security updates, such as anti-virus data files, are required as one way to protect such systems from malware.

While externally induced malware may be the most common means for malware to become installed in a vehicle, it is not inconceivable that hardware or software installed during manufacturing or assembly of the vehicle may be compromised by malware, either deliberately malicious or that, under some previously unknown circumstances, cause the vehicle to operate in a manner that is undesired.

SUMMARY

The systems of a vehicle, if compromised, may pose a more serious threat to persons and property, as compared to a personal computer. For example, disengaging an automobile's safety systems (e.g., antilock brakes, airbags, traction control, etc.) has a clear potential to cause harm. However, seemingly innocuous systems, since they are in a vehicle, may distract an operator or cause an operator to take an action that is inappropriate. For example, malware that causes an automobile's entertainment system to play at full volume may cause the operator to direct their attention away from driving in an attempt to address the problem.

It is with respect to the above issues and other problems that the embodiments presented herein were contemplated.

The present disclosure provides the ability to proactively monitor a vehicle (e.g., car, truck, van, SUV, motorcycle, bicycle, boat, aircraft, etc.), a user's interaction with a vehicle, a vehicle's interaction with other vehicle's and/or other systems, and/or actions of a vehicle to determine if the vehicle has had harmful, undesirable, and/or unauthorized hardware and/or software modifications ("malware"). Malware may include a computer virus, and/or unauthorized hardware modification made thereto that could be harmful to the vehicle, provide unauthorized access to the vehicle or systems thereof, and/or perform undesired operations (e.g., report faults when none exist, fail to report faults, indicate an emergency condition when none exists, alter settings and/or preferences, track the vehicle without authorization, etc.).

Many of the embodiments disclosed herein are directed specifically to an automobile for the sake of simplicity only. Such embodiments are for convenience to avoid unnecessarily complicating the disclosure and are in no way intended to be limiting to any particular vehicle or type of vehicle. Furthermore, embodiments disclosed may apply to autonomous vehicles or vehicles capable of operating, at least partially, in an autonomous mode. Embodiments that utilize an interaction or the presence of a human operator may apply to autonomous vehicles whereby the operator is a computer system, a remote human operator, and/or a human operator interacting with the vehicle at a later time.

In one embodiment, a machine learning system is disclosed to detect the presence of malware. Systems are provided to allow an untrusted hardware and/or software component to operate in a "sandbox" such that any behavior that is determined to be undesired may be mitigated or even prevented.

In one embodiment, a vehicle monitoring and analysis system is disclosed, comprising: a computing device configured to receive an emergency state from one emergency reporting sensor and to receive one or more data inputs from a plurality of sensors from a vehicle under analysis; an artificial intelligence engine configured to analyze the emergency state with the one or more data inputs to confirm that an emergency state exists; the computing device being configured to, upon the artificial intelligence engine determining that an emergency state is not in error, processing the emergency state; and the computing device being configured to, upon the artificial intelligence engine determining that an emergency state is in error, processing a false emergency state.

In another embodiment, a vehicle monitoring and analysis system is disclosed comprising: a computing device configured to receive one or more data inputs from a vehicle under analysis; an artificial intelligence engine configured to receive and analyze the one or more data inputs to determine if the vehicle has had at least one of an unauthorized hardware and software modification; and a reporting system configured to alert a user if the artificial intelligence engine determines that the vehicle has had at least one of an unauthorized hardware and software modification.

In yet another embodiment, a vehicle monitoring and analysis system is disclosed, comprising: a computing device configured to receive data inputs from a plurality of vehicles under analysis; an artificial intelligence engine configured to receive and analyze the data inputs to determine if at least one of the plurality of vehicles indicates the presence of malware; and a reporting system configured to issue an alert upon the artificial intelligence engine determining that the vehicle does indicate the presence of malware.

In particular, embodiments of the present disclosure provide the ability to determine whether a vehicle has had malware, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Also, while the disclosure is described in terms of exemplary embodiments, it should be appreciated that individual aspects of the disclosure can be separately claimed. The present disclosure will be further understood from the drawings and the following detailed description. Although this description sets forth specific details, it is understood that certain embodiments of the disclosure may be practiced without these specific details. It is also understood that in some instances, well-known circuits, components and techniques have not been shown in detail in order to avoid obscuring the understanding of the invention The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
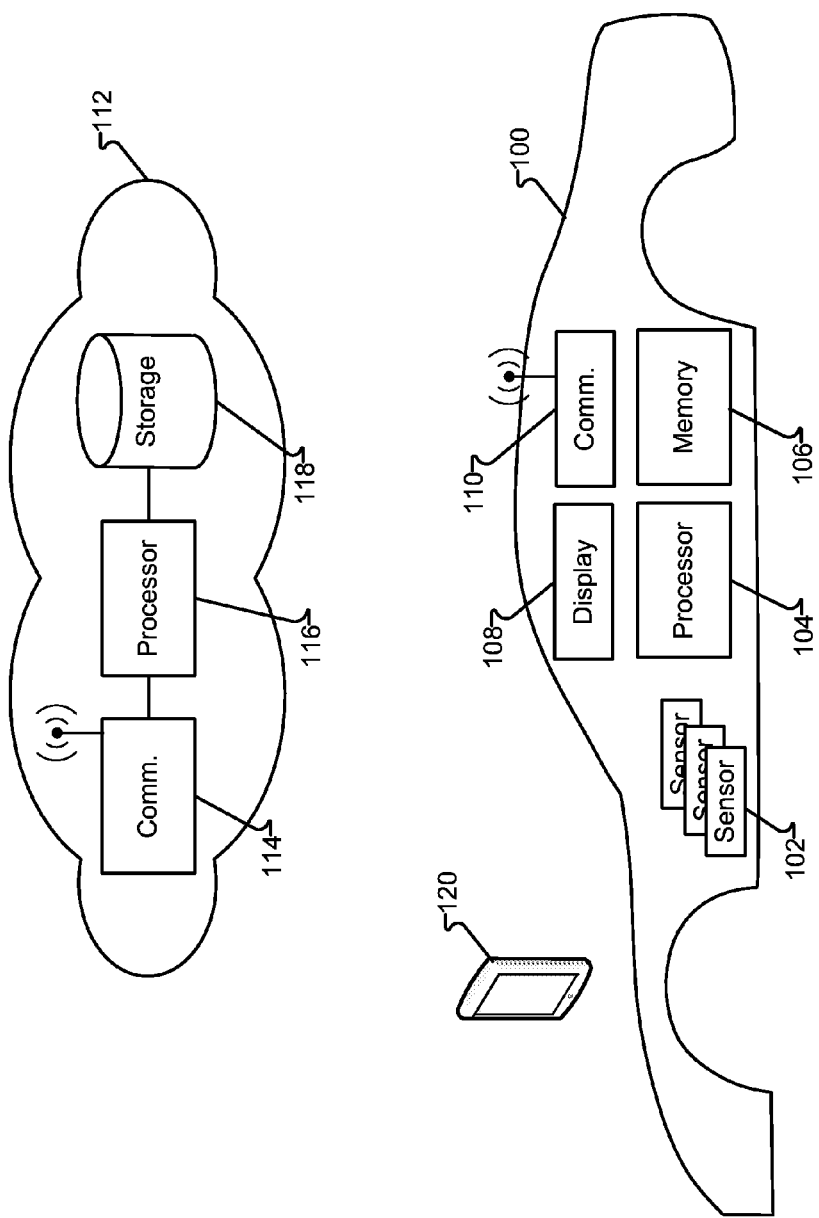
FIG. 1 depicts an illustrative vehicle monitoring system in accordance with embodiments of the present disclosure.

FIG. 1 shows an illustrative vehicle monitoring system in accordance with at least some embodiments of the present disclosure. In one embodiment, vehicle 100 includes a number of sensors 102, processor 104, memory 106, display 108, and communication module 110. An intra-vehicle communication system (not shown) allows data to be exchanged between two or more components within vehicle 100. In one embodiment, the intra-vehicle communication system is, or is compliant with, a controller area network data bus ("CAN BUS").

Sensors 102 are provided. Sensors 102 may comprise sensors utilized by the vehicle itself to monitor operational parameters (e.g., oxygen sensor, throttle position, tire pressure, etc.) and/or sensors having a primary purpose of monitoring at least one aspect of the vehicle that may be affected by malware. Two or more of sensors 102 may be redundant. For example, one sensor 102 may be a factory-installed throttle position detector that is utilized to control operational conditions of the engine and transmission and a second sensor 102 may be a duplicate throttle position sensor operational to output data solely to a malware detection process (discussed more completely below with respect to processor 104). One of sensors 102 may operate as if it were two or more sensors. For example, a throttle position sensor may output a processed value (e.g., idle, one-quarter, 38%, full, etc.). The raw data, such as a voltage or register value, may be available such that the one physical sensor 102 may provide two or more sets of data. As a benefit, malware that attempts to modify the processed output (e.g., throttle position=idle when it is actually full) of the one of physical sensor 102 and but may not have the ability to affect the unprocessed signal such as an observed or input value to the sensor 102 (e.g., "line_03=−1.7 v"). Therefore, a malware detection process may compare the processed output value of one of sensors 102 to an accessed unprocessed observed value and determine if a discrepancy exists, without requiring two sensors, and respond accordingly.

Processor 104 executes instructions to detect malware. Processor 104 is variously embodied and may comprise one or more dedicated processors, shared processors, and/or distributed processors. Processor 104 is in communication with one or more of sensors 102, memory 106, display 108, and communications 110. As is known in the art of processors, processor 104 may be embodied as two or more microprocessors, single or multi-core microprocessors, instructions distributed to a plurality of microprocessors, and/or integrated into or co-integrated with one or more of the aforementioned components. Other processor 104 configurations may be implemented without departing from the disclosure provided herein.

Memory 106 comprises electronic storage accessible/usable by processor 104 and/or other components. Memory 106, similar to certain embodiments of processor 104, may be embodied as a stand-alone device and/or integrated and/or co-integrated into one or more other components. Memory 106 may comprise one or more of volatile, non-volatile, magnetic, optical, solid state, fixed, removable, and/or other electronic storage medium.

Display 108 provides information related to the state of vehicle 100, such as the presence of malware and/or steps to take to mitigate and/or remove the effects of any detected malware. Display 108 may be optical (e.g., CCD, LCD, etc.) intended to be read by a human observer. Display 108 may also accept inputs (e.g., touch screen, pushbuttons, pointing device interface, etc.) to enable a human to interact with instructions executed by processor 104. Display 108 may be a simple indicator (e.g., "Service soon" indicator) or even omitted, such as by utilizing communication module 110 and a display associated with a linked device or system.

Communication module 110 provides wired and/or wireless connectivity to one or more other devices and systems. In one embodiment, mobile communications device 120 connects to communication module 110. Mobile communications device 120 may be a wired or wireless diagnostic device or other specialty computer, general purpose computer (e.g., laptop, terminal, tablet, etc.), and/or communication device (e.g., smart phone). In another embodiment, cloud system 112 via communication module 114 connects to communication module 110. Cloud system 112 comprises communication module 114, processor 116, and storage 118. Cloud system 112 may process data from sensors 102 or otherwise duplicate, supplement, and/or replace certain tasks of processor 104. In a further embodiment, communication device 110 may be in communication with cloud system 112 via mobile communications device 120 (e.g., Blue Tooth to WiFi, WiFi to cellular, etc.).

Cloud computing generally refers to computing services (e.g., processing and/or storage) available to a client device via a connection to a network. Most commonly the "cloud" is the Internet whereby a client device is authorized to access a website or other interface of a service provider to access computing services. In addition to the Internet, private networks may also be utilized (e.g., intranet, VPN, etc.). Often the maintenance and security is provided as a service of the cloud such that the user of the client device need not be concerned with security, updates, hardware failure, uptime, and other administrative issues.

Cloud system 112 is variously embodied and generally comprises a cloud computing platform. Cloud system 112 may comprise one or more of public networks (e.g., Internet), private networks (e.g., telephone, cellular, WiFi, satellite, etc.), wired, wireless, and/or portions thereof to communicate externally, such as to and from communications module 110 of vehicle 100, as well as between components within cloud system 112. Furthermore cloud system 112 may comprise one or more networks of the foregoing or other configuration. Storage 118 and/or processor 116 may generally be transparent to users of the embodiments described herein, such as by the implementation of distributed computing and storage capacity provided by network attached devices.

The components of FIG. 1 provide various configurations to implement malware detection and attenuation strategies. In one embodiment, vehicle 100 may, without benefit of other systems, detect, diagnose, notify and/or attenuate malware. In another embodiment, vehicle 100 may utilize mobile communications device 120 for any one or more of the detecting, diagnosing, notifying, and/or attenuating malware. In another embodiment, vehicle 100 may utilize cloud system 112 for one or more of detecting, diagnosing, notifying, and/or attenuating malware. In yet another embodiment, at least a portion of vehicle 100 internal components (e.g., processor 104), mobile communications device 120, and cloud system 112 are utilized for at least one of the detecting, diagnosing, notifying, and/or attenuating malware.

One or more of processor 104, process 116, and/or a processor in mobile communications device 120 (not shown) provide the logic to process malware detection and/or attenuation instructions. Processing may be shared, duplicated, verified by any one processor 104, processor 116, and or mobile communications device 120 processor for the benefit of validating, confirming, or diagnosing any other one of processor 104, processor 116, and or mobile communications device 120 processor. As those skilled in the art will appreciate, additional processors may be implemented without departing from the embodiments provided herein.

Figure 2:
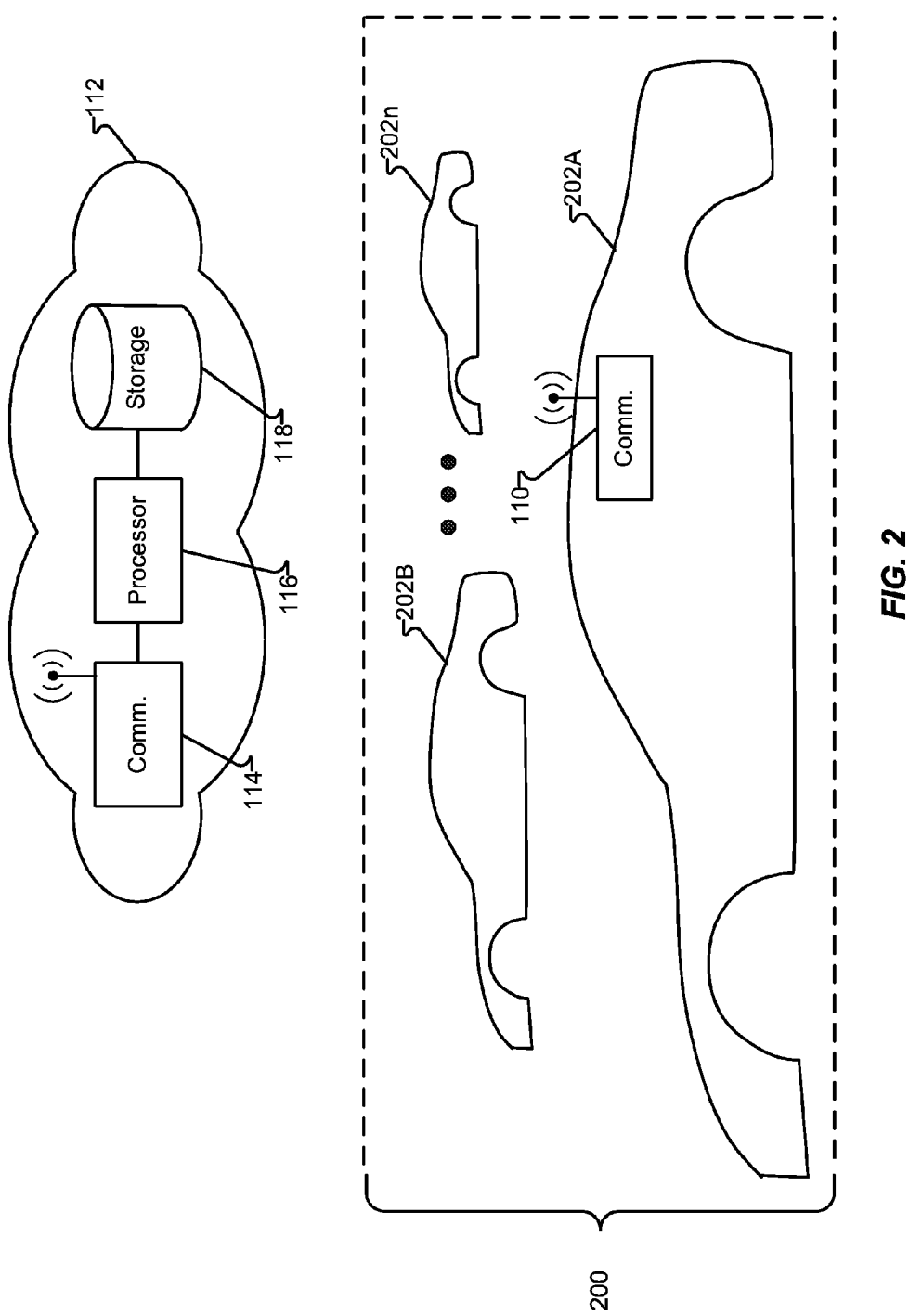
FIG. 2 depicts an illustrative vehicle fleet monitoring system in accordance with embodiments of the present disclosure.

FIG. 2 shows an illustrative vehicle fleet monitoring system in accordance with at least some embodiments of the present disclosure. Vehicles 202 comprise fleet 200. Each of vehicles 202 comprises sensors, processors, communication module 110 and other malware detection and/or attenuation systems as described with respect to FIG. 1. However, to avoid unnecessarily complicating the figures, vehicle 202A is shown with only communication module 110 illustrated and vehicles 202B-202n are not show with components thereof.

In one embodiment, fleet 200 comprises n-number of vehicles 202. Vehicles 202 each communicate with cloud system 112. The frequency by which one or more of vehicles 202 may communicate with cloud system 112 will vary from continuous, or nearly so, to infrequently, even never. Vehicles 202 that never connect to cloud system 112 may require other means to detect and attenuate malware, such as those described with respect to FIG. 1, and be effectively excluded from fleet 200. Vehicles excluded from fleet 200 may rejoin fleet 200 upon connecting to cloud system 112.

Cloud system 112 may utilize communication module 114 to collect raw data, processed data, settings, configurations, results of prior malware attenuations, user data, and/or other information associated with ones of vehicles 202. Collected data may then be stored in storage 118 and processed by processor 116. As a benefit, processor 116 has a larger pool of data to determine what behavior is and is not a concern. For example, vehicle 202A may be operated entirely within a tropical climate. Malware that disengages the vehicle's traction control may never be detected by the systems of vehicle 202A. However, vehicle 202B may be operated in a climate subject to ice and snow and have an opportunity to quickly detect any issue associated with traction control and, accordingly, the presence of malware.

In another embodiment, data from fleet 200 provides a larger pool of trusted data. For example, a subset of vehicles 202 have had a modification. The effect on the modified vehicles 202 versus the unmodified vehicles 202 may indicate that the modification is benign and otherwise trust the modification. Any vehicle 202 subsequently having the same modification may be subject to less scrutiny or be immediately trusted.

In another embodiment, updates to anti-malware systems (e.g., virus signature files, known compromised components, etc.) may be provided to vehicles 202 via communication module 114, 110. Should any one or more vehicles 202 be unable to communicate with communication module 114, such as due to inaccessibility of a communication signal (e.g., out of cellular telephone or sideband radio range) or due to damage, vehicle 202 may still be able to respond to a malware without access to cloud system 112.

Figure 3:
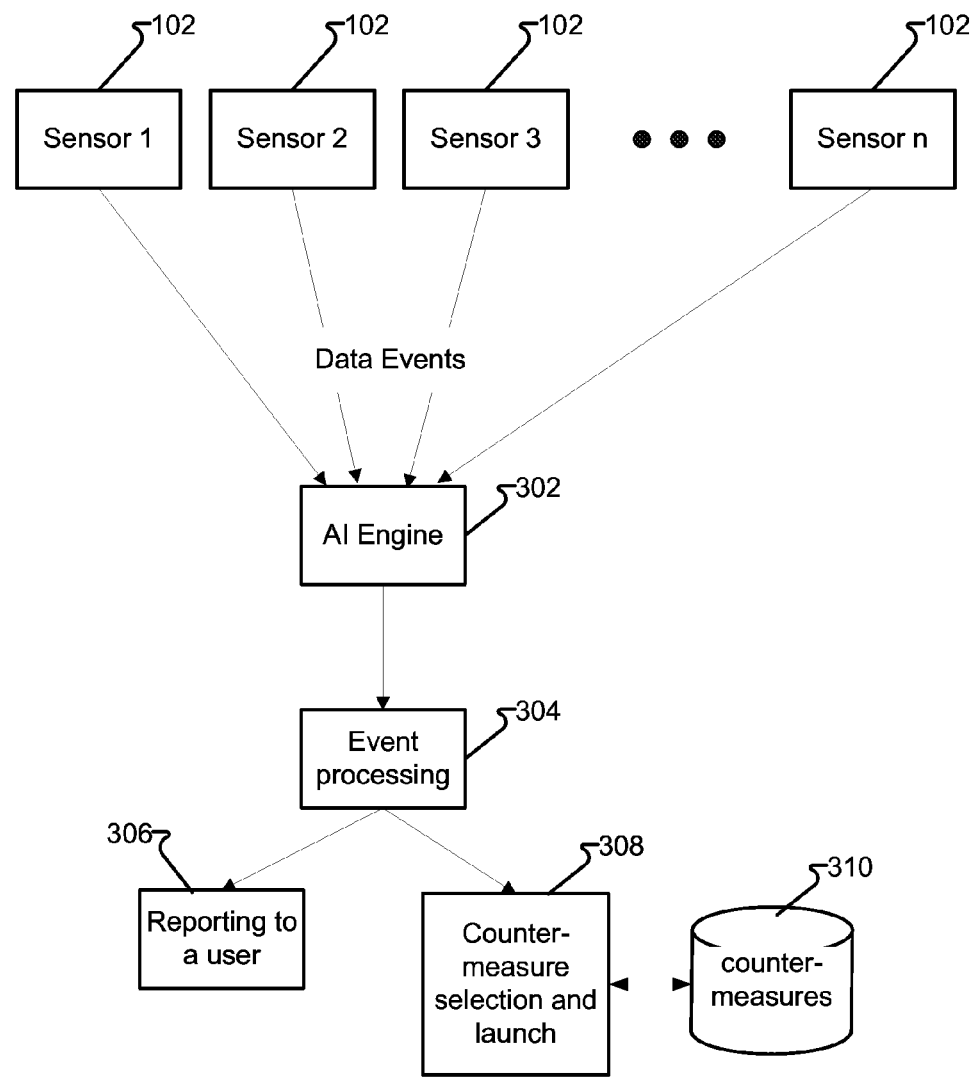
FIG. 3 depicts a first process in accordance with embodiments of the present disclosure.

FIG. 3 shows process 300 in accordance with at least some embodiments of the present disclosure. A number of sensors 102 are provided to monitor a vehicle 100. Vehicle 100 may be monitored perpetually, periodically, and/or on-demand. A processor, such as one or more of mobile communications device 120 and/or processors 104, 116, may then receive the data events from the number of sensors 102 directly and/or via memory 106, storage 118, and/or other storage medium. The processor executing instructions of an artificial intelligence engine 302 to analyze the data events received from sensors 102. Artificial intelligence engine 302, as a separate process or as integrated into artificial intelligence engine 302, performs event processing 304.

In one embodiment, event processing 304 reports 306 to a user a summary conduction, such as when all systems are working normally, expert assistance is required, etc., or more detailed, such as an itemization of systems, tests, conditions, and results. Reporting 306 may be detailed Reporting 306 may be visual, such as to display 108. Reporting 306 may also be electronic to mobile communications device 120 and/or cloud system 112.

In another embodiment, event processing 304 may incorporate or call countermeasures 308 such that malware detected by artificial intelligence engine 302 may be attenuated or even removed entirely. Countermeasures 308 may relay, in whole or in part, on stored countermeasures 310. Countermeasures 308 may be automatic and/or manual. In a further embodiment, countermeasures 308 may be passive, such as by not allowing an isolated hardware or software modification to become trusted.

Figure 4:
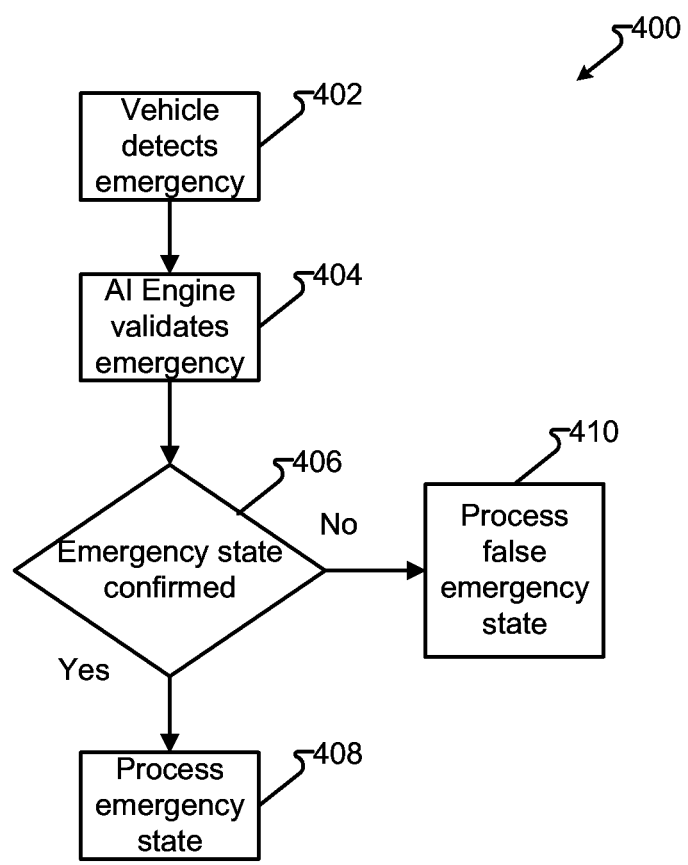
FIG. 4 depicts a second process in accordance with embodiments of the present disclosure.

FIG. 4 shows process 400 in accordance with at least some embodiments of the present disclosure. As can be appreciated, emergency reporting may have more serious consequences if affected by malware. Reporting emergencies, when none exist, result in the allocation of resources that may become unavailable to respond to a true emergency. Similarly, not reporting an emergency may also result in serious consequences. In addition to the reporting of an emergency when none exists, and vice versa, under and over reporting an emergency may similarly result in serious consequences. For example, a low-speed collision resulting in no injured parties, but reported as life threatening injuries present risks emergency personnel and others who may attempt to respond to a non-existent situation. Conversely, a high-speed reported as inconsequential may cause delays in responding and exacerbating an already critical situation.

In one embodiment, step 402 detects an emergency. Step 404 validates the emergency via the artificial intelligence engine 302. Step 406 confirms or disproves the emergency state. If no emergency state is confirmed, processing continues to step 410 wherein a false emergency state is processed. If step 406 is true, processing continues and step 408 processes the emergency state.

Step 404 may perform a number of preprogrammed and/or learned processes in which the emergency may be validated. For example, if one sensor 102 reports an airbag deployment validation may be performed with respect to another sensor 102, such as an inertial or GPS navigation system. Should step 404 conclude that the vehicle is being operated normally, such as no drastic change in speed or direction, that would indicate a collision, step 406 may then indicate that no emergency exists and step 410 processes the false emergency. Step 410 may utilize vehicle 100 communication module 110 to report the condition, report the condition to handheld computer 120, and/or display 108. In such a manner the malware may be addressed appropriately.

In another example, step 404 may access another sensor 102 and determine the vehicle made an unusual change in speed and/or direction and/or a sensor 102 may indicate the coolant pressure has suddenly dropped to zero, any one or more may further indicate a collision and the presence of an emergency. In such circumstances step 406 may confirm the emergency condition and step 408 processes the emergency.

Step 404 may implement learned behavior. For example, one vehicle 202 may be operated by a "lead foot" and be subject to high g-force readings for acceleration, deceleration, and/or lateral acceleration (e.g., turning). Another vehicle 202 may be driven more conservatively. As a benefit, step 404 may consider such learned operating parameters into consideration when validating the emergency.

Figure 5:
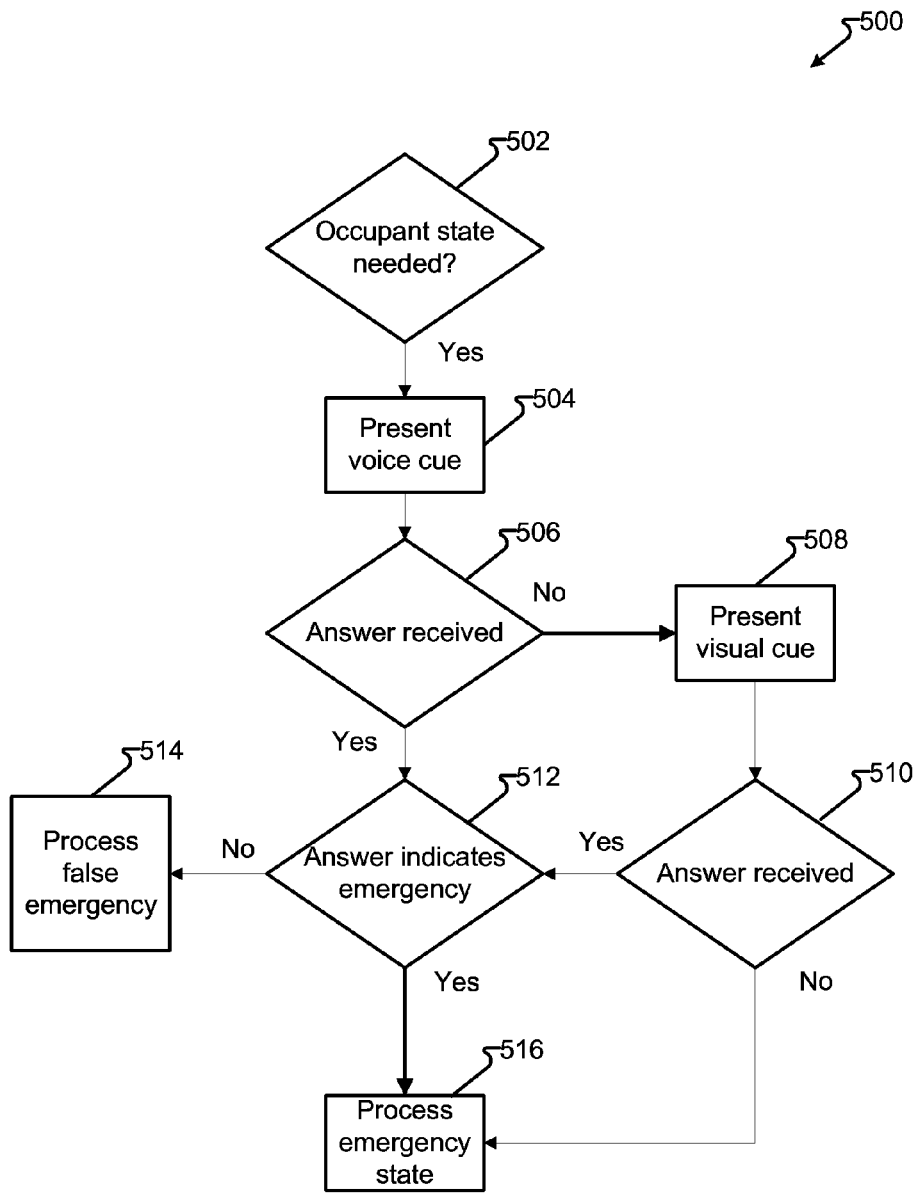
FIG. 5 depicts a third process in accordance with embodiments of the present disclosure.

FIG. 5 shows process 500 in accordance with at least some embodiments of the present disclosure. Validation of an emergency state, such as by step 404, is variously embodied. In one embodiment, step 502 determines if the occupant state is needed. For example, one emergency state may indicate a tire failure, however, other sensors 102 may indicate the vehicle gradually decelerated to a stop and after a few minutes the engine was turned off by the operator. Under such circumstances, it may be determined that the occupant's state may be assumed to be a non-emergency, wherein process 500 may terminate. However, if step 502 determines the occupant's condition is needed, processing may continue to step 504, wherein voice cues are presented to the occupant.

The presenting of voice cues in step 504 may be via a live operator and/or a signal generated by processor 104, such as a sound file and/or text-to-speech program utilizing text data retrieved from memory 106 and/or storage 118. Step 506 determines if a response is received from at least one occupant. If no, processing continues to step 508 wherein visual cues are presented. Visual cues may be to flash the interior lights, console lights, and/or present a prompt on a display, such as display 108. Step 510 may determine if an answer is received via a manual input, such as by touching at least a portion of touch screen 108, hitting a button associated with the prompt (e.g., "Hit any button you can reach twice if you can see this."). For example, a passenger in the rear seat may be able to hit "window down" twice in response to such a prompt.

In a further embodiment, artificial intelligence engine 404 may utilize learned behavior, such as, by learning that the person who uses this vehicle may speak German and possibly not English—respond in German first, try English if no satisfactory response.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A vehicle monitoring and analysis system, comprising:
a computing device configured to receive, from a vehicle under analysis, an emergency state from an emergency reporting sensor and to receive one or more data inputs from a plurality of sensors from the vehicle under analysis;
an artificial intelligence engine configured to analyze the emergency state with the data input from a selected portion of the sensors comprising less than all of the plurality of sensors to confirm that the emergency state exists, wherein the selected portion of the sensors excludes ones of the sensors determined to be untrusted, due to a determined likelihood of the presence of malware, and omitting data inputs from the excluded ones of the sensors when confirming that the emergency state exists;
the computing device being configured to, upon the artificial intelligence engine determining that the emergency state is not in error, processing the emergency state; and
the computing device being configured to, upon the artificial intelligence engine determining that the emergency state is in error, processing a false emergency state.

2. The system of claim 1, wherein
the artificial intelligence engine further analyzes the emergency state with the selected portion of the sensors to determine if the emergency state is associated with occupant injuries;
upon determining the emergency state is associated with occupant injuries, the artificial intelligence engine causes the vehicle to present a voice prompt to be played to a vehicle occupant; and
wherein the artificial intelligence engine further determines if the emergency state is in error in accordance with a response received to the voice prompt.

3. The system of claim 2, wherein the artificial intelligence engine confirms the emergency state is not in error upon receiving, prior to receiving the response to the voice prompt, a timeout indicator associated with a previously determined wait time duration.

4. The system of claim 3, wherein the artificial intelligence engine, upon receiving the timeout indicator, causes the vehicle to present a prompt to solicit a tactile response from the occupant via at least one physical input device of the vehicle.

5. The system of claim 3, wherein the artificial intelligence engine, upon receiving the timeout indicator, causes the vehicle to present a visual prompt on a display of the vehicle.

6. The system of claim 1, wherein at least a portion of at least one of the computing device and the artificial intelligence engine is located externally to the vehicle and in communication with the vehicle via a communications link.

7. The system of claim 1, wherein:
the artificial intelligence engine determines a selected one sensor of the selected portion of the sensors as being deterministic as to whether the emergency state is in error or not in error;
the artificial intelligence engine accesses a data input from the selected one sensor of the selected portion of the sensors;
wherein determining the emergency state is not in error further comprises, determining, by the artificial intelligence engine, at least one value of the data input from the selected one sensor of the selected portion of the sensors confirms the emergency state; and
wherein determining the emergency state is in error further comprises, determining, by the artificial intelligence engine, at least one value of the data input from the selected one sensor of the selected portion of the sensors confirms the false emergency state.

8. The system of claim 1, wherein processing the false emergency state comprises causing the computing device to present a notification by at least one of a display within the vehicle, a handheld computer in communication with the vehicle, and a centralized reporting system in communication with the vehicle, wherein the notification comprises indicia of the false emergency state.

9. The system of claim 8, wherein the notification further comprises indicia of malware.

10. The system of claim 1, wherein the emergency reporting sensor is one of the plurality of sensors.

11. A vehicle monitoring and analysis system, comprising:
- a computing device configured to receive data inputs from a vehicle under analysis;
- an artificial intelligence engine configured to receive and analyze the data inputs to determine if the vehicle has had a modification comprising at least one of an unauthorized hardware and an unauthorized software modification, wherein the determination further comprises determining whether data from one of the data inputs validates the data from a different one of the data inputs or the data from one of the data inputs invalidates the data from the different one of the data inputs; and
- the artificial intelligence engine, upon determining the data from one of the data inputs invalidates the data from the different one of the data inputs, selects a countermeasure to the at least one of the unauthorized hardware and the unauthorized software modification and launches the selected countermeasure, and wherein the selected countermeasure comprises, excluding the data inputs, received from a sensor providing at least one of the data from one of the data inputs and the data from the different one of the data inputs, from an emergency state determination.

12. The system of claim 11, the computing device comprises a mobile communications device.

13. The system of claim 12, wherein the mobile communications device comprises a smartphone that includes the artificial intelligence engine.

14. The system of claim 12, wherein the artificial intelligence engine is provided on a device other than the mobile communications device.

15. The system of claim 11, wherein the one or more data inputs includes at least one input from a controller area network data bus (CAN BUS) system.

16. The system of claim 15, wherein the CAN BUS system comprises a vehicle bus standard designed to allow microcontrollers and devices to communicate with each other within the vehicle without a host computer.

17. The system of claim 15, wherein the one or more data inputs include at least one of vehicle brake information, vehicle information, vehicle traction information, vehicle diagnostics information, fluid level information, and tire pressure information.

18. A vehicle monitoring and analysis system, comprising:
- a computing device configured to receive data inputs from a plurality of vehicles under analysis;
- an artificial intelligence engine configured to receive and analyze the data inputs to determine if a first vehicle of the plurality of vehicles indicates the presence of malware, the determination further comprises determining a data input from a first sensor from the first vehicle is in disagreement with a second sensor from the first vehicle; and
- reporting, to an artificial intelligence engine associated with a second vehicle that the second vehicle indicates the presence of malware and causing the artificial intelligence engine associated with the second vehicle to exclude data inputs from at least one of a corresponding first sensor of the first vehicle and a corresponding second sensor of the first vehicle from a determination of an emergency state of the second vehicle.

19. The system of claim 18, wherein the artificial intelligence engine analyzes the data inputs by comparing a first set of data inputs to a trusted collection of data inputs; and
- wherein the determination of the first vehicle indicates the presence of malware, further comprises, determining a first set of data inputs associated with the first vehicle is outside of threshold deviation from the trusted collection of data inputs.

20. The system of claim 18, wherein the computing device is configured to receive the data inputs via a communication module associated with ones of the plurality of vehicles and a communication module associated with the computing device.

* * * * *